(12) United States Patent
Takeda et al.

(10) Patent No.: US 7,206,489 B2
(45) Date of Patent: Apr. 17, 2007

(54) FIXING TOOL FOR FIXING A FIBER HOLDING MEMBER TO AN OPTICAL FIBER

(75) Inventors: Jun Takeda, Tokyo (JP); Yuichi Koreeda, Tokyo (JP); Akihiro Onogawa, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/184,393

(22) Filed: Jul. 19, 2005

(65) Prior Publication Data

US 2006/0018620 A1 Jan. 26, 2006

(30) Foreign Application Priority Data

Jul. 20, 2004 (JP) ............................. 2004-211700

(51) Int. Cl.
*G02B 6/00* (2006.01)

(52) U.S. Cl. ........................................ 385/134; 385/52

(58) Field of Classification Search ................ 385/52, 385/134, 137
See application file for complete search history.

(56) References Cited

U.S. PATENT DOCUMENTS 6,782,183 B2 * 8/2004 Chiang et al. .............. 385/137

FOREIGN PATENT DOCUMENTS

| JP | 8313759 | 11/1996 |
|----|---------|---------|
| JP | 2004118031 | 4/2004 |

* cited by examiner

*Primary Examiner*—Sarah Song
(74) *Attorney, Agent, or Firm*—Collard & Roe, P.C.

(57) ABSTRACT

In a fixing tool for fixing a fiber holding member to an optical fiber, a tool body receives the optical fiber and the fiber holding member. In this event, the fiber holding member is disposed on a first specific part of the optical fiber. A positioning device fixes a second specific part of the optical fiber to the tool body in the state where the optical fiber and the fiber holding member are received in the tool body. The second specific part is a portion between the first specific part and a longitudinal end face of the optical fiber.

9 Claims, 4 Drawing Sheets

FIXING TOOL FOR FIXING A FIBER HOLDING MEMBER TO AN OPTICAL FIBER

This application claims priority to prior Japanese application JP 2004-211700, the disclosure of which is incorporated herein by reference.

BACKGROUND OF THE INVENTION

This invention relates to a technique of manufacturing an optical connector for connecting optical fibers by bringing their longitudinal end faces into contact with each other and, in particular, to a fixing tool for fixing a fiber holding member to an optical fiber.

An optical fiber is very thin and easily bent. It is therefore difficult to incorporate the optical fiber into an optical connector. In view of the above, into the optical connector of the type, a fiber holding member is used in order to incorporate the optical fiber. Specifically, the fiber holding member is fixed to the optical fiber and then the fiber holding member is held by a housing of the optical connector.

In order to fix the fiber holding member to the optical fiber, the optical fiber is inserted through a hole formed in the fiber holding member and is protruded outward from the fiber holding member by a predetermined length. In this state, the fiber holding member is fixed to the optical fiber. Thereafter, the optical fiber and the fiber holding member are incorporated into the housing of the optical connector.

The optical connector is connected via an adapter having an aligning mechanism. By the use of a restoring force caused by buckling of the optical fiber, the longitudinal end face of the optical fiber is brought into contact with that of another optical fiber (for example, see Japanese Unexamined Patent Application Publications (JP-A) Nos. 2004-118031 and H8-313759).

However, because of a clearance (about 100 μm) between an inner peripheral surface of the hole of the fiber holding member and an outer peripheral surface of the optical fiber, it is difficult to control an angle of a protruding portion of the optical fiber which protrudes from the fiber holding member. This results in a problem that a buckling direction of the optical fiber is not stably determined. In case where the optical fibers are closely adjacent to each other, the optical fibers interfere with each other so that the performance is not stabilized and, in the worst case, the optical fibers are damaged.

In order to solve the above-mentioned problems, the aligning mechanism of the adapter is required to have a strict dimensional accuracy. This prevents the optical connector from being provided at a low cost.

SUMMARY OF THE INVENTION

It is therefore an object of this invention to provide a fixing tool which is for fixing a fiber holding member to an optical fiber and which is capable of easily controlling an angle of a protruding portion of the optical fiber.

It is another object of this invention to provide an inexpensive fixing tool which is capable of achieving an optical connector having a stable performance.

Other objects of the present invention will become clear as the description proceeds.

According to an aspect of the present invention, there is provided a fixing tool for fixing a fiber holding member to an optical fiber. The fixing tool comprises a tool body for receiving the optical fiber and the fiber holding member to dispose the fiber holding member on a first specific part of the optical fiber and a positioning device for fixing a second specific part of the optical fiber to the tool body in the state where the optical fiber and the fiber holding member are received in the tool body, the second specific part being a portion between the first specific part and a longitudinal end face of the optical fiber.

DESCRIPTION OF THE PREFERRED EMBODIMENT

Figure 1:
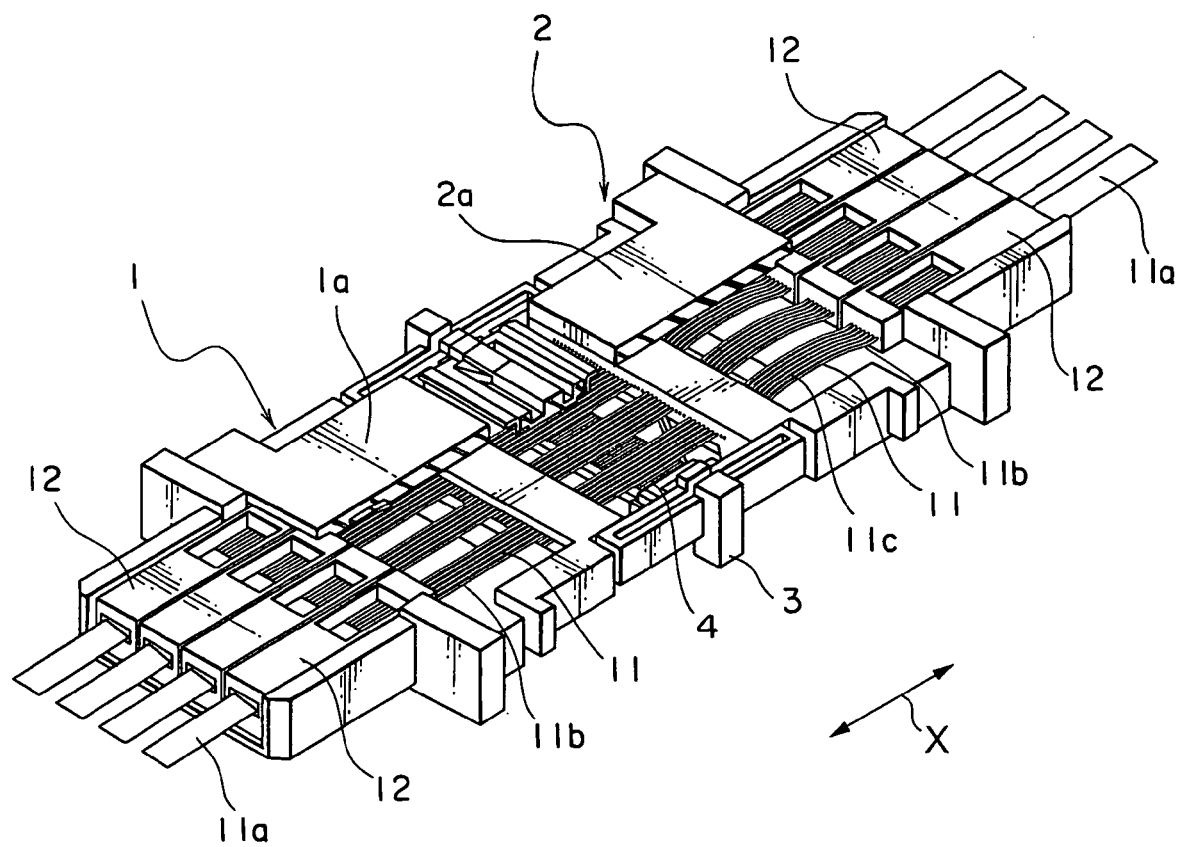
FIG. 1 is a perspective view, partly in section, showing a connected state of an optical connector using an optical fiber fixed to a fiber holding member.

In order to facilitate an understanding of this invention, description will at first be made of an example of an optical connector with reference to FIG. 1.

The optical connector illustrated in the figure comprises two plugs 1 and 2 connectable to each other and an adapter 3 used to connect the plugs 1 and 2 to each other. Each of the plugs 1 and 2 comprises four groups of optical fibers 11 and fiber holding members 12 each of which is fixed to each group of the optical fibers 11. The fiber holding members 12 are engaged with housings 1a and 2a of the plugs 1 and 2 so that the optical fibers 11 are properly positioned in a connecting direction X.

In each group, the optical fibers 11 has mutually united or bonded portions 11a and mutually separated portions 11b. The fiber holding member 12 is fixed to a boundary between these portions 11a and 11b, i.e., first specific parts.

The adapter 3 has an aligning mechanism 4 for aligning the optical fibers 11 of the plugs 1 and 2. When the plugs 1 and 2 are connected to each other, the optical fibers 11 of the plugs 1 and 2 are aligned by the aligning mechanism 4 so that their centers are coincident with each other, and are brought into contact with each other in the connecting direction X. In order to obtain a load required for appropriate contact between the optical fibers 11, each of the optical fibers 11 of the plug 2 is provided with a bent portion 11c formed by buckling so that a restoring force of the bent portion 11c is used as the load.

Figure 2:
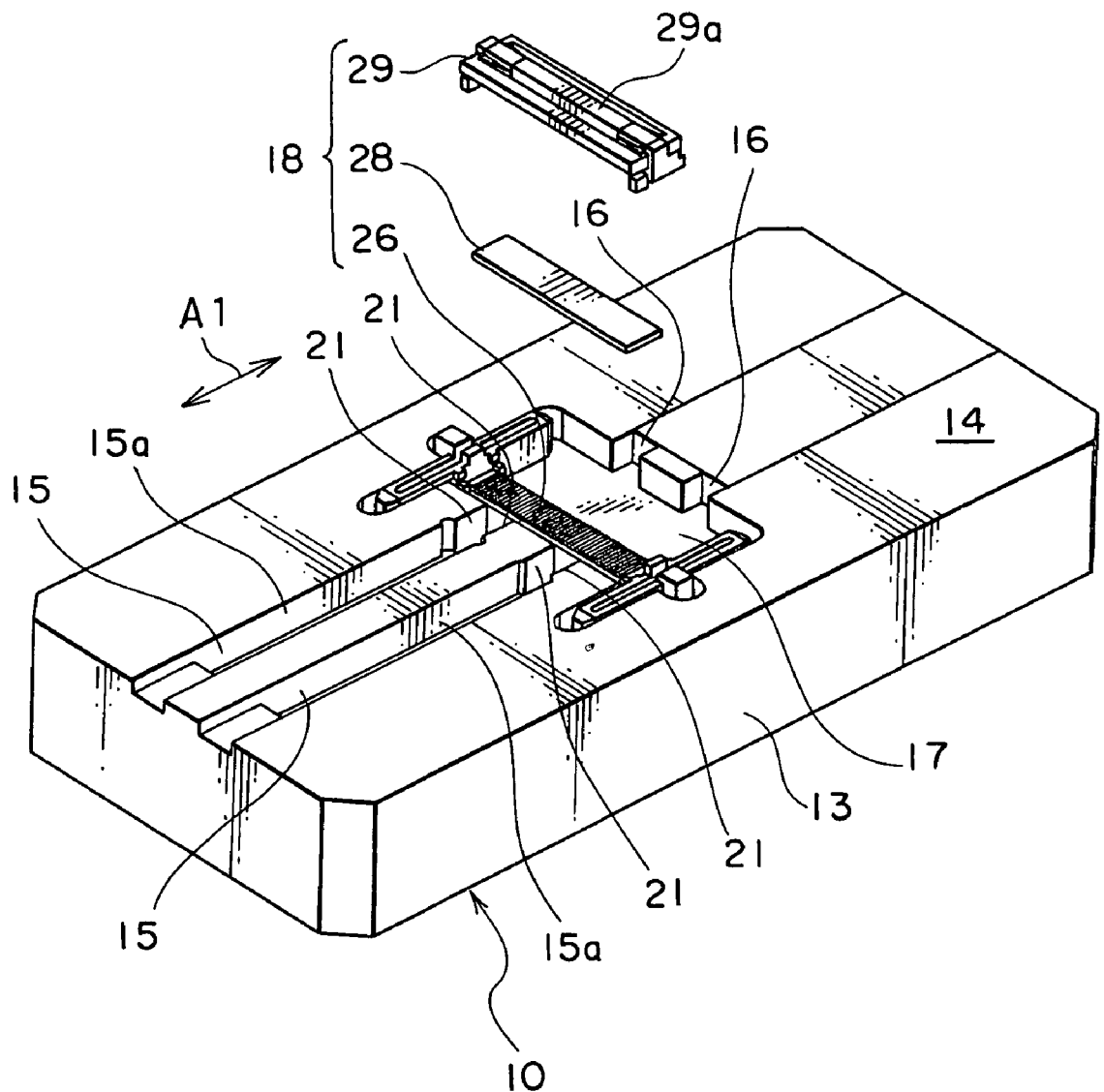
FIG. 2 is an exploded perspective view of a fixing tool according to an embodiment of this invention.

Referring to FIG. 2 in addition to FIG. 1, description will be made of a fixing tool according to one embodiment of this invention.

The fixing tool depicted by 10 is for fixing the fiber holding member 12 to the optical fibers 11 and comprises a tool body 13 of a generally long plate-like shape. The tool body 13 has a principal surface 14 and two principal grooves 15 formed on the principal surface 14. Each of the principal grooves 15 is for receiving the optical fibers 11 and the fiber holding member 12 and extends in a predetermined direction A1.

The tool body 13 further has two contacting portions 16 to be kept in contact with longitudinal end faces of the optical fibers 11 when the optical fibers 11 are received in the principal grooves 15. Each of the contacting portions 16 has a contacting surface perpendicular to the predetermined direction A1.

The tool body 13 is provided with a large recessed portion 17 as a first receiving portion formed between the two principal grooves 15 and the two contacting portions 16. In the recessed portion 17, a positioning device 18 for positioning the optical fibers 11 with respect to the tool body 13 is disposed.

The positioning device 18 comprises a base member 26 fixed to a bottom surface of the recessed portion 17 of the tool body 13. The base member 26 has a receiving surface provided with a number of receiving grooves 27 extending in the predetermined direction A1 to receive the portions 11b of the optical fibers 11, i.e., second specific parts. Therefore, the optical fibers 11 are properly positioned by the receiving grooves 27 in a radial direction thereof or a transversal direction. Each receiving groove 27 preferably has a V-shaped section.

The positioning device 18 further comprises a pressing member 28 for pressing the second specific parts of the optical fibers 11 towards the base member 26, and a fixing member 29 for fixing the pressing member 28 to the tool body 13. The pressing member 28 is preferably formed by an elastic material. The fixing member 29 has a beam 29a.

Each of the principal grooves 15 has a second receiving portion 15a for receiving the fiber holding member 12. Between the second receiving portion 15a and the recessed portion 17, a pair of protruding portions 21 are formed to protrude inward from opposite side walls of the principal groove 15. The protruding portions 21 serve as an engaging portion to be engaged with the fiber holding member 12 received in the principal groove 15 in the predetermined direction A1 to inhibit movement of the fiber holding member 12 towards the contacting portion 16.

Referring to FIGS. 3 to 6, description will be made of a method of fixing the fiber holding member 12 to the optical fibers 11 by the use of the fixing tool 10.

Figure 3:
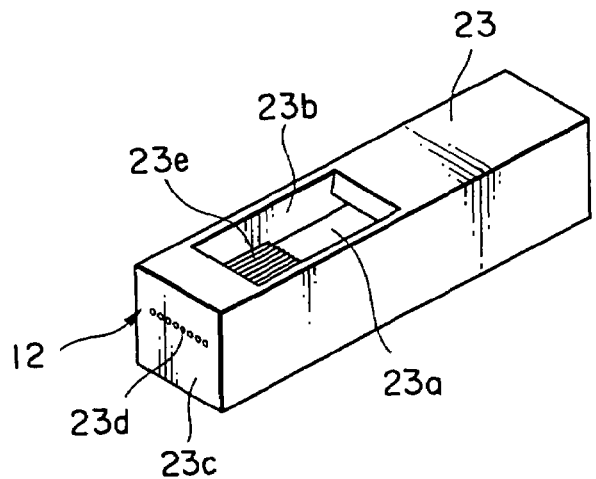
FIG. 3 is an enlarged perspective view of the fiber holding member.

As shown in an enlarged view in FIG. 3, the fiber holding member 12 comprises a main body 23 of a rectangular cylindrical shape. The main body 23 has a cavity 23a opened at a rear end face, a large opening 23b communicating with the cavity 23a, and a number of small holes 23d arranged in a single line on a front end face 23c. The small holes 23d also communicates with the cavity 23a.

Figure 4:
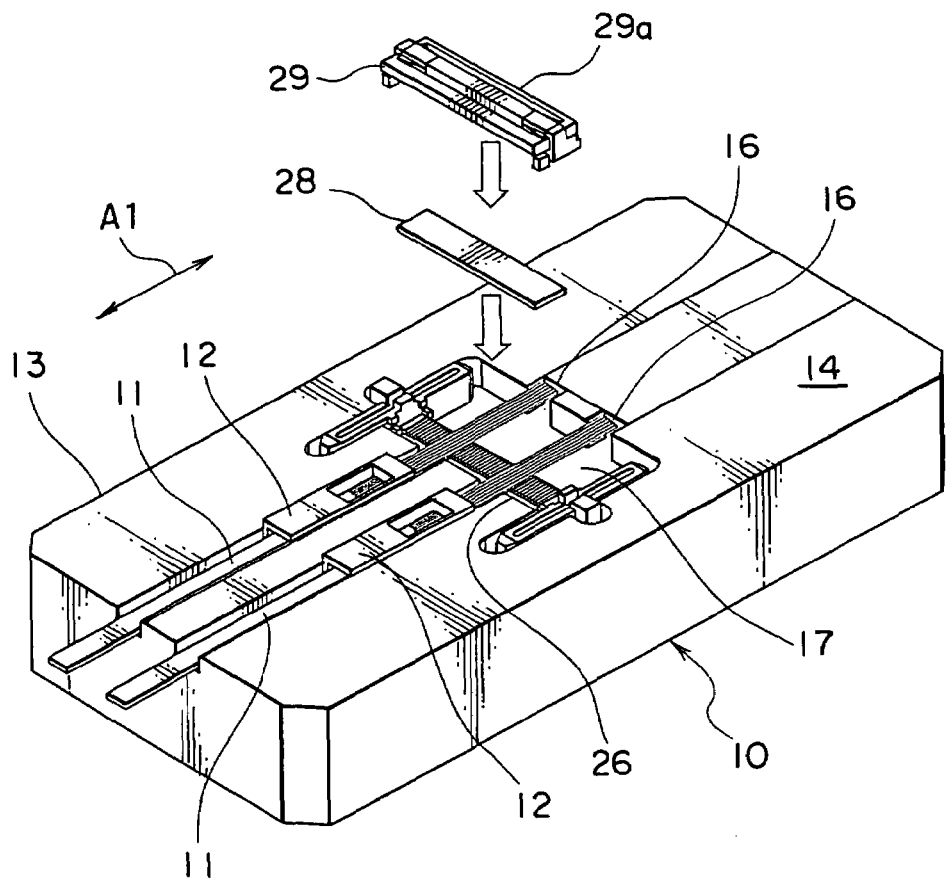
FIG. 4 is a perspective view of the fixing tool in FIG. 2 in the state where the optical fiber and the fiber holding member are set therein.
Figure 5:
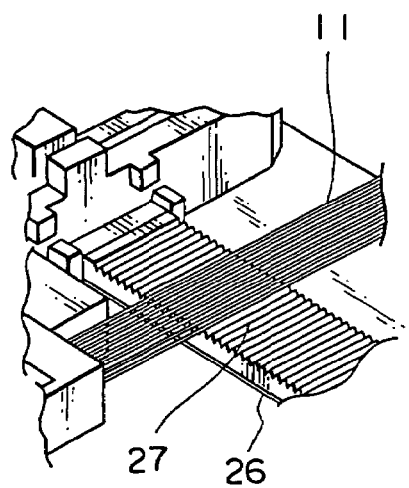
FIG. 5 is an enlarged view of a characteristic part in FIG. 4.
Figure 6:
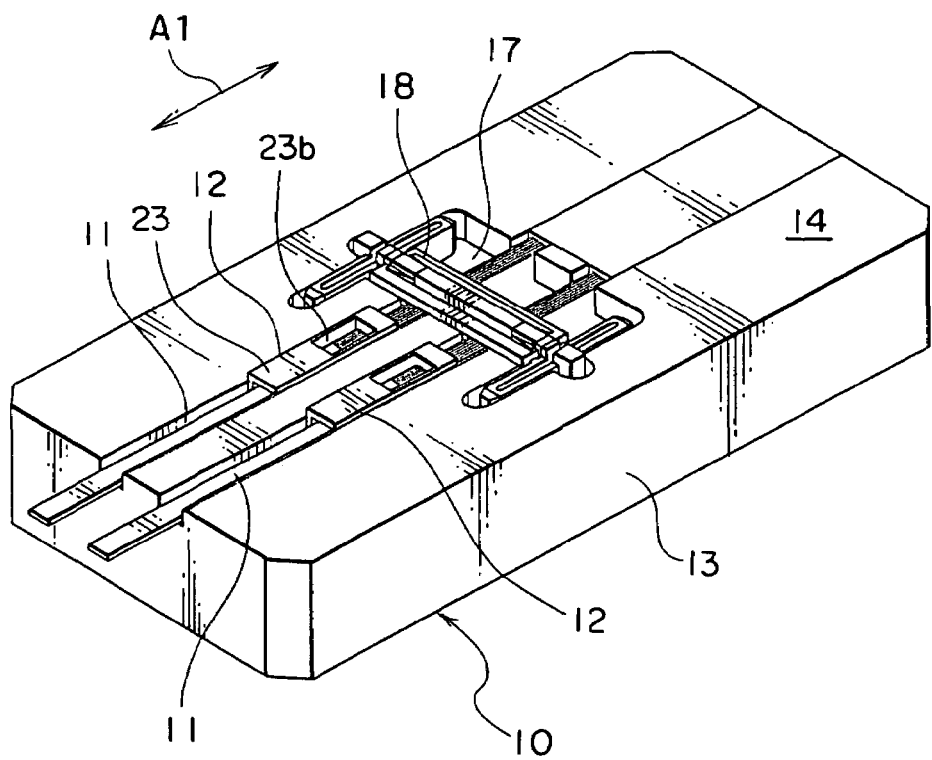
FIG. 6 is a perspective view of the fixing tool in FIG. 2 in the state where the optical fiber and the fiber holding member are held thereby.

The optical fibers 11 are inserted into the cavity 23a of the fiber holding member 12 from a rear side and then inserted through the small holes 23d, respectively. Insertion of the optical fibers 11 is guided by a number of guide grooves 23e Thus, the positioning device 18 is disposed at the first specific parts of the optical fibers 11. In this state, the optical fibers 11 and the fiber holding member 12 are fitted to the principal groove 15 of the tool body 13 as illustrated in FIG. 4. As a consequence, the optical fibers 11 are received in the recessed portion 17 in the state where the optical fibers 11 are separated from one another and individually received in the receiving grooves 27 of the base member 26. On the other hand, in a most part of the principal groove 15, the optical fibers 11 are joined together.

After the optical fibers 11 and the fiber holding member 12 are fitted to the principal groove 15 of the tool body 13, the optical fibers 11 are moved in the predetermined direction A1 to bring the longitudinal end faces thereof into contact with the contacting portion 16. In this state, the pressing member 28 is put on the optical fibers 11 received in the receiving grooves 27. Further, the fixing member 29 is fixed to the tool body 13 and the pressing member 28 is pressed against the second specific parts of the optical fibers 11 by the beam 29a. Thus, the second specific parts of the optical fibers 11 are fixedly held by the tool body 13 by the positioning device 18. As a consequence, the optical fibers 11 are accurately and reliably aligned between the receiving grooves 27 of the base member 26 and the pressing member 28 so that a protruding angle of each of the optical fibers 11 can easily be controlled.

Further, the fiber holding member 12 is moved in the predetermined direction A1 to be engaged with the protruding portions 21. As a consequence, the protruding length of each of the optical fibers 11 from the front end face 23c of the main body 23 of the fiber holding member 12 is kept at a predetermined length. In this state, an adhesive is poured through the opening 23b of the main body 23 to be filled in the cavity 23a of the main body 23. Then, the adhesive is set or hardened to fix the fiber holding member 12 to the optical fibers 11.

Before high-temperature setting, the adhesive is spread into a clearance between an inner peripheral surface of each small hole 23d of the fiber holding member 12 and an outer peripheral surface of each optical fiber 11. Therefore, in the state where the protruding angle of the optical fiber 11 is controlled, the optical fiber 11 can be adhered to the fiber holding member 12.

For adhesion of the optical fiber 11, it is preferable to use an adhesive having a low viscosity. In this case, the adhesive is reliably spread into the above-mentioned clearance. Therefore, the fiber holding member 12 need not have a strict dimensional accuracy so that the optical connector can be provided at a low cost.

In case where the pressing member 28 is formed by an elastic material, it is possible to absorb a dimensional error at the above-mentioned clearance. Therefore, it is possible to further improve the accuracy in controlling the protruding angle. Since the protruding angle of the optical fiber 11 is favorably controlled, the buckling direction of the optical fiber 11 is kept constant. Thus, it is possible to realize the connector having a stable performance without interference between the adjacent optical fibers 11.

Each of the base member 16 and the pressing member 28 may be formed by a silicone resin material. In this case, the clearance is suppressed to about 1 μm.

While the present invention has thus far been described in connection with the preferred embodiment thereof, it will readily be possible for those skilled in the art to put this invention into practice in various other manners. As the positioning device 18, use may be made of a capillary having a hole slightly greater in diameter than the optical fiber 11. In the foregoing, description has been made of the case where the single fiber holding member is fixed to a plurality of the optical fibers. However, this invention is also applicable to the case where the single fiber holding member is fixed to a single optical fiber. It is noted here that this invention is not limited to production of the optical connector illustrated in FIG. 1 but is also applicable to production of other various types of optical connectors.

What is claimed is:

1. A fixing tool for fixing a fiber holding member to an optical fiber, comprising:

a tool body for receiving the optical fiber and the fiber holding member to dispose the fiber holding member on a first specific part of the optical fiber; and a positioning device for fixing a second specific part of the optical fiber to the tool body in the state where the optical fiber and the fiber holding member are received in the tool body, the second specific part being a portion between the first specific part and a longitudinal end face of the optical fiber, wherein the tool body has:

a principal groove extending in a predetermined direction to receive the optical fiber and the fiber holding member;

a contacting portion facing the principal groove in the predetermined direction to be kept in contact with the longitudinal end face of the optical fiber received in the principal groove; and an engaging portion formed in the principal groove so as to be engaged with the fiber holding member in the predetermined direction to inhibit movement of the fiber holding member towards the contacting portion, and wherein the positioning device comprises:

a base member fixed to the tool body and having a receiving surface for receiving the second specific part; and a pressing member for pressing the second specific part to the base member, whereby the base member positions the optical fiber relative to the tool body in the predetermined direction in a state where the optical fiber is received in the principal groove.

2. The fixing tool according to claim 1, wherein the engaging portion has a pair of protruding portions protruding inward from opposite side walls of the principal groove.

3. The fixing tool according to claim 1, wherein the tool body has a recessed portion formed between the principal groove and the contacting portion to receive the positioning device.

4. The fixing tool according to claim 1, wherein the receiving surface has a receiving groove extending in the predetermined direction, the receiving groove receiving the optical fiber to position the optical fiber in its radial direction.

5. The fixing tool according to claim 4, wherein the receiving groove has a V-shaped section.

6. The fixing tool according to claim 1, wherein the positioning device further includes a fixing member for fixing the pressing member to the tool body.

7. The fixing tool according to claim 1, wherein the pressing member is made of an elastic material.

8. The fixing tool according to claim 1, wherein the positioning device comprises a capillary which has a hole to receive the optical fiber inserted therethrough and which is held by the tool body.

9. A method of fixing a fiber holding member to an optical fiber, comprising:

preparing a tool body which has a principal groove extending in a predetermined direction, an engaging portion formed at an intermediate position of the principal groove, a contacting portion facing the principal groove in the predetermined direction, and a recessed portion between the principal groove and the contacting portion;

disposing the optical fiber and the fiber holding member on the tool body so that the optical fiber extends in the principal groove and the recessed portion to be in contact with the contacting portion and that the fiber holding member is placed in the principal groove and engaged with the engaging portion in the predetermined direction;

disposing a positioning device in the recessed portion to position the optical fiber relative to the tool body in the predetermined direction;

fixing the holding member to the optical fiber by an adhesive to produce a combination of the optical fiber and the holding member; and removing the combination from the tool body.

* * * * *